United States Patent
Lin et al.

(10) Patent No.: US 12,551,111 B2
(45) Date of Patent: Feb. 17, 2026

(54) METHOD AND SYSTEM FOR DYNAMIC PHYSIOLOGICAL CHARACTERISTIC REGION CAPTURING

(71) Applicant: Industrial Technology Research Institute, Hsin-Chu (TW)

(72) Inventors: Hsing-Chen Lin, Taichung (TW); Cheng-Yi Yang, Taichung (TW); Zhong-Wei Liao, Kaohsiung (TW); Cheng-Lii Chang, Hsinchu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 1132 days.

(21) Appl. No.: 17/124,600

(22) Filed: Dec. 17, 2020

(65) Prior Publication Data

US 2022/0192507 A1    Jun. 23, 2022

(51) Int. Cl.
*A61B 5/01* (2006.01)
*G06T 7/55* (2017.01)
(Continued)

(52) U.S. Cl.
CPC .............. *A61B 5/015* (2013.01); *G06T 7/55* (2017.01); *G06V 10/25* (2022.01); *G06V 40/103* (2022.01);
(Continued)

(58) Field of Classification Search
None
See application file for complete search history.

(56) References Cited

U.S. PATENT DOCUMENTS 8,265,392 B2   9/2012 Wang et al.
10,383,531 B2   8/2019 Lai et al.
(Continued)

FOREIGN PATENT DOCUMENTS

CN   102341828 A   2/2012
CN   110279406 A   9/2019
(Continued)

OTHER PUBLICATIONS

Nakayama et al. Non-contact Measurement of Respiratory and Heart Rates Using a CMOS Camera-equipped Infrared Camera for Prompt Infection Screening at Airport Quarantine Stations IEEE 2015 (Year: 2015).*
Pele, "Covid-19 Raises Demand for Thermal Imagers and Detectors", Jun. 1, 2020, https://www.eettaiwan.com/20200601nt01-covid-19-raises-demand-for-thermal-imagers-and-detectors.
Taiwan Patent Office Office Action issued on May 13, 2021, Taiwan.
TW OA issued on Oct. 4, 2021.

*Primary Examiner* — Jay B Shah
(74) *Attorney, Agent, or Firm* — WPAT, PC (57) ABSTRACT

A method for dynamic physiological characteristic region capturing includes: detecting a human body and generate thermal images with continuous time-sequence data; detecting the thermal images and locate a skeleton from one thermal images; based on the skeleton to capture a nose and a human face, the human face is set as an ROI is further divided into image blocks; relating the image blocks to the thermal images; based on variation of temperature information in continuous time-sequence data for the image blocks to divide the image blocks into the first and the second frequency variation blocks; and, analyzing the temperature information in the continuous time-sequence data to the first and the second frequency variation blocks to obtain different physiological information of the human body. In addition, a system for the same is also provided.

17 Claims, 8 Drawing Sheets

(51) Int. Cl.
*G06V 10/25* (2022.01)
*G06V 40/10* (2022.01)
*G06V 40/16* (2022.01)
*H04N 23/23* (2023.01)

(52) U.S. Cl.
CPC .......... *G06V 40/166* (2022.01); *G06V 40/171* (2022.01); *H04N 23/23* (2023.01)

(56) References Cited

U.S. PATENT DOCUMENTS

| | | |
|---|---|---|
| 10,582,196 B2 | 3/2020 | Perez-Ramirez et al. |
| 2013/0096439 A1* | 4/2013 | Lee ..................... A61B 5/7257 600/479 |
| 2017/0367590 A1* | 12/2017 | Sebe .......................... G06T 7/11 |
| 2020/0237238 A1 | 7/2020 | Watanabe |

FOREIGN PATENT DOCUMENTS

| | | |
|---|---|---|
| CN | 111839519 A | 10/2020 |
| TW | 201401186 | 1/2014 |
| TW | M514000 | 12/2015 |
| TW | I557678 | 11/2016 |
| TW | I577338 | 4/2017 |
| TW | M548266 | 9/2017 |
| TW | I625679 | 6/2018 |
| TW | 201902416 A | 1/2019 |
| TW | 201909838 A | 3/2019 |
| TW | 201917633 A | 5/2019 |

\* cited by examiner

METHOD AND SYSTEM FOR DYNAMIC PHYSIOLOGICAL CHARACTERISTIC REGION CAPTURING

TECHNICAL FIELD

The present disclosure relates in general to a physiological characteristic detection technology, and more particularly to a method and a system for dynamic physiological characteristic region capturing.

BACKGROUND

In the art, a typical non-contact image-based is physiological detection (RGB images for example) is usually to search a fixed ROI (Region of interest) on a human face for detection, such as a cheek or a default region on the face. Such a detection is usually less adaptable and robust, and the detected heart rate and the respiratory rate to be detected would somehow to be biased by the unstable or shifting ROI due to surrounding light, a face movement, unstable lens distance or a blocked face (wearing a face mask for example).

In addition, the current thermal imaging technique can be only pre-screened in fever. Except for detecting the body temperature, if this technique is intended to detect other human physiological information such as heart rate and respiratory rate, other detection devices shall be integrated together. Therefore the multi-physiological information detection can be realized.

Accordingly, the issue how to provide a non-contact method and system for dynamic physiological characteristic region capturing, without invading privacy, that integrates a thermal image (or a depth lens) to capture a dynamic specific area on a human face where a variation of the body temperature can be obviously observed, therefore the physiological characteristics of the human body such as the heart rate and the respiratory rate can be accurately detected, is definitely urgent and an important issue.

SUMMARY

In one embodiment of this disclosure, a method for dynamic physiological characteristic region capturing includes the steps of:
(A) applying a thermal image sensor to detect a human body and then generate a plurality of thermal images with continuous time-sequence data;
(B) applying a skeleton detection unit to detect the plurality of thermal images and then locate a skeleton from one of the plurality of thermal images;
(C) based on the skeleton, applying a nose-and-face searching unit to capture a nose and a human face, which are set together as an ROI (Region of interest), and the ROI is further divided into a plurality of image blocks;
(D) applying a temperature-array time-sequence variation storage unit to relate the plurality of image blocks to each of the plurality of thermal images, so that each of the plurality of image blocks has corresponding temperature information in the continuous time-sequence data;
(E) based on variation of the temperature information in the continuous time-sequence data for the plurality of image blocks, applying a variation-block detecting unit to divide the plurality of image blocks into a plurality of first frequency variation blocks and a plurality of second frequency variation blocks; and
(F) applying a computing unit to analyze the temperature information in the continuous time-sequence data with respect to the plurality of first frequency variation blocks and the plurality of second frequency variation blocks, so as to obtain different physiological information of the human body.

In another embodiment of this disclosure, a system for dynamic physiological characteristic region capturing includes a thermal image sensor and a processor.

The thermal image sensor is used for detecting a human body and then generating a plurality of thermal images with continuous time-sequence data. The processor includes a skeleton detection unit, a nose-and-face searching unit, a temperature-array time-sequence variation storage unit, a variation-block detecting unit and a computing unit.

The skeleton detection unit is used for detecting the plurality of thermal images and then locating a skeleton from one of the plurality of thermal images. The nose-and-face searching unit is used for capturing a nose and a human face, which are set together as an ROI (Region of interest), and the ROI is further divided into a plurality of image blocks. The temperature-array time-sequence variation storage unit is used for relating the plurality of image blocks to each of the plurality of thermal images, so that each of the plurality of image blocks has corresponding temperature information in the continuous time-sequence data. The variation-block detecting unit is used for evaluating variation of the temperature information in the continuous time-sequence data for the plurality of image blocks to divide the plurality of image blocks into a plurality of first frequency variation blocks and a plurality of second frequency variation blocks. The computing unit is used for analyzing the temperature information in the continuous time-sequence data with respect to the plurality of first frequency variation blocks and the plurality of second frequency variation blocks, so as to obtain different physiological information of the human body.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
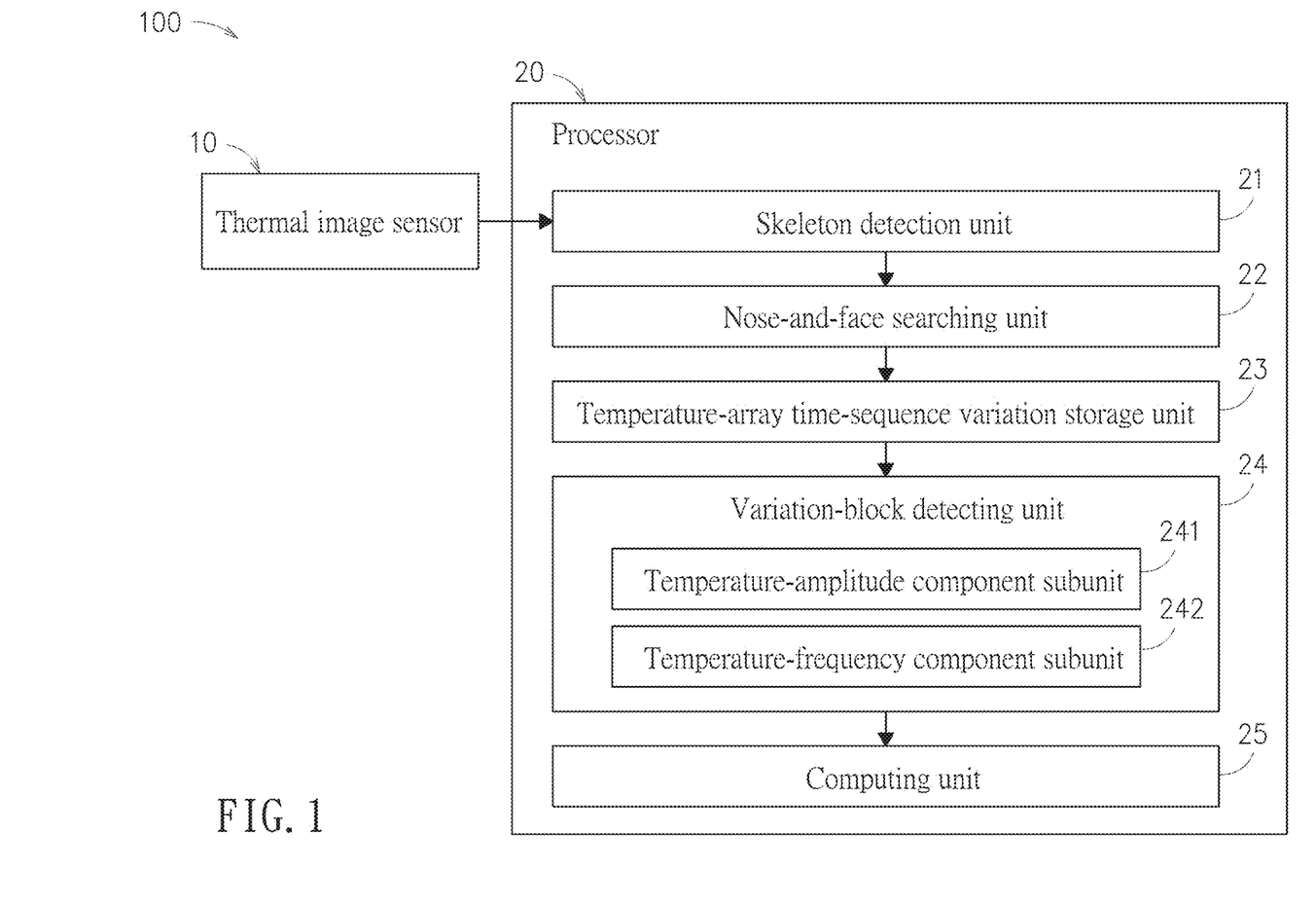
FIG. 1 is a schematic block view of an embodiment of the system for dynamic physiological characteristic region capturing in accordance with this disclosure.

Referring to FIG. 1, a system for dynamic physiological characteristic region capturing 100 provided by this disclosure includes a thermal image sensor 10 and a processor 20.

The thermal image sensor 10 can detect a human body, and then generate a plurality of thermal images with continuous time-sequence data.

The processor 20 includes a skeleton detection unit 21, a nose-and-face searching unit 22, a temperature-array time-sequence variation storage unit 23, a variation-block detecting unit 24 and a computing unit 25.

The processor 20 can evaluate and process thermal images generated by the thermal image sensor 10, so that physiological information of the human body such as, but not limited to, the body temperature, the heart rate and the respiratory rate captured by the thermal image sensor 10 can be obtained.

Figure 2:
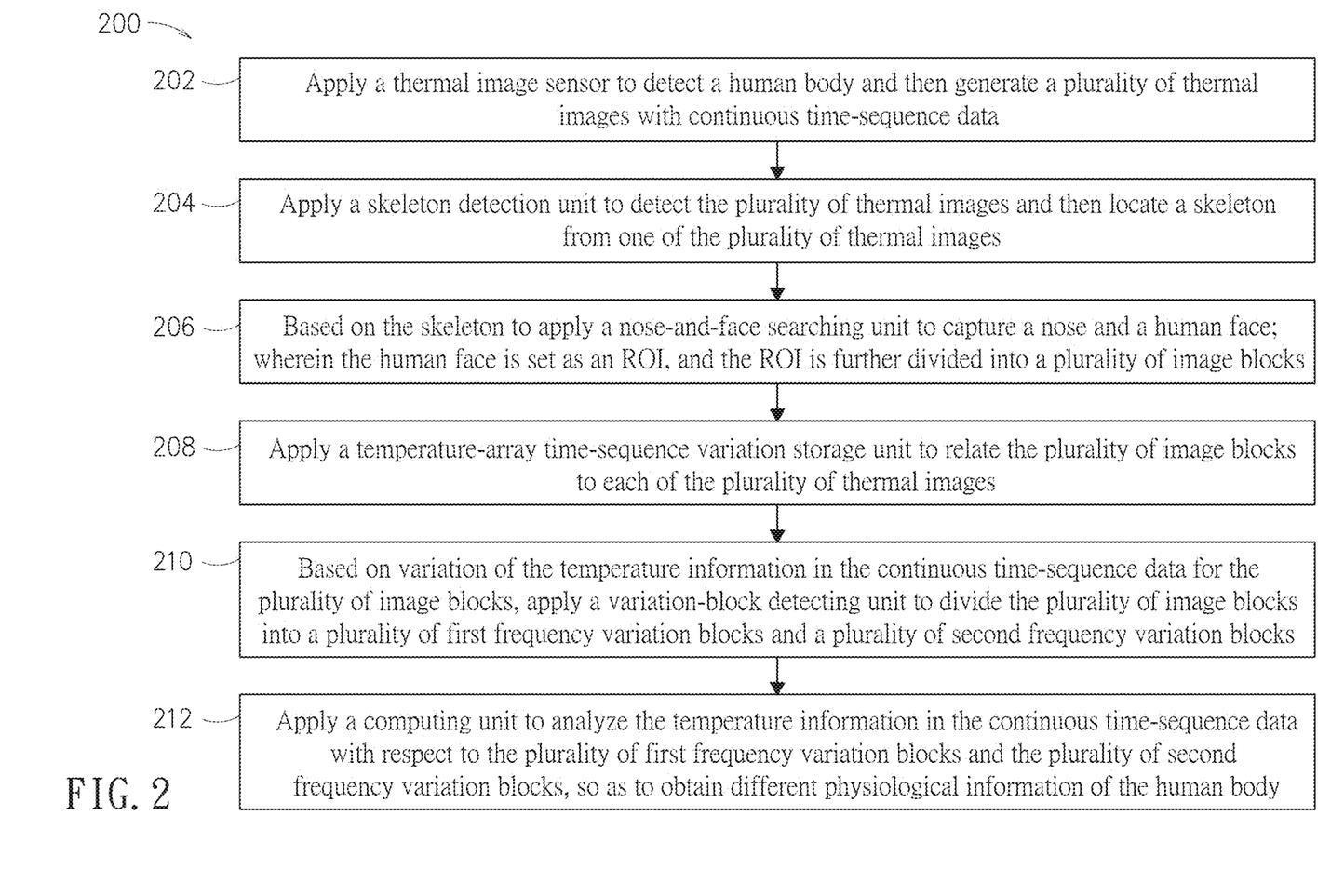
FIG. 2 is a flowchart of an embodiment of the method for dynamic physiological characteristic region capturing in accordance with this disclosure.

Referring to FIG. 1 and FIG. 2, the system for dynamic physiological characteristic region capturing 100 of FIG. 1 can be used to perform the method for dynamic physiological characteristic region capturing 200 of FIG. 2, and the method 200 mainly includes Steps 202~212 as follows.

Step 202: The thermal image sensor 10 is applied to detect the human body so as to generate a plurality of thermal images with continuous time-sequence data. Each of the thermal images includes a color heatmap diagram and a grey-scale heatmap diagram. Since the thermal image sensor 10 is introduced to detect the human body, thus the body temperature can be directly and immediately obtained. Regarding the other physiological information such as the heart rate and the respiratory rate, following analytic steps can be performed.

Figure 3A:
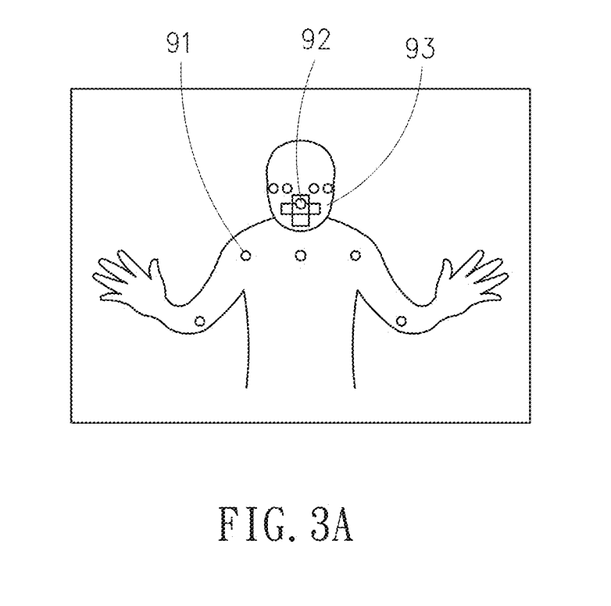
FIGS. 3A-3E demonstrate sequentially and schematically exemplary examples of images generated or applied while in performing the method for dynamic physiological characteristic region capturing in accordance with this disclosure.

Step 204: The skeleton detection unit 21 is applied to detect a plurality of thermal images, and a skeleton 91 is also obtained from one of the thermal images. As shown in FIG. 3A, the skeleton 91 can includes a head portion of the human body, and also the entire or part of the trunk. In this embodiment, the skeleton detection unit 21 can be a circuit architecture for processing the skeleton detection.

Figure 3B:
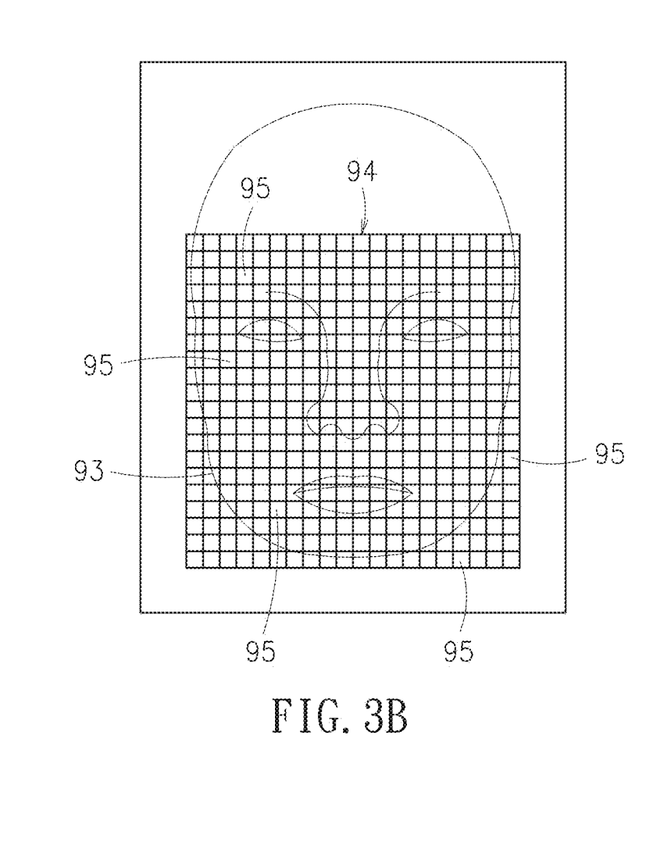

Step 206: The nose-and-face searching unit 22 is used to evaluate the skeleton 91 to further capture a nose 92 and a human face 93 (see FIG. 3A). The human face 93 is set to an ROI (Region of interest) 94, and the ROI 94 is further divided into a plurality of image blocks 95, as shown in FIG. 3B. In this embodiment, the nose-and-face searching unit 22 can be a circuit architecture for searching the nose and human face.

While in performing Step 204, the skeleton detection unit 21 would detect the color heatmap diagram of the corresponding the thermal image so as to obtain the skeleton 91. Then, in Step 206, the nose-and-face searching unit 22 would evaluate the skeleton 91 in the color heatmap diagram so as to capture the nose 92 and the human face 93 therein, and then the heatmap diagram including the skeleton 91, the nose 92 and the human face 93 would be overlapped onto the grey-scale heatmap diagram of the thermal image for further analysis.

In Step 206, it is determined how the nose-and-face searching unit 22 can evaluate the position of the nose to further define the human face. In an exemplary example, by having the position of the nose as a center, and a distance to an obvious interface in the grey-scale heatmap diagram as a radius, then a corresponding circle to represent the human face can be defined. This area for the human face is set as an ROI. Then, the nose-and-face searching unit 22 further divides the ROI 94 into a plurality of square image blocks 95 (say Z blocks), in which each of the Z square image blocks 95 has a size of (X pixels)×(Y pixels). In this embodiment, X is equal to Y. In some other embodiments, X may be different to Y. For example, as shown in FIG. 3B, 400 ((20 pixels)×(20 pixels)) square image blocks 95 are shown.

Then, in Step 208: The temperature-array time-sequence variation storage unit 23 relates a plurality of image blocks 95 to each of the corresponding thermal images, such that continuous time-sequence data corresponding to each of the image blocks 95 has relevant temperature information. In this embodiment, the temperature-array time-sequence variation storage unit 23 can be a circuit architecture for managing the storage of time-sequence variation in the temperature array.

For n square image blocks formed by (m pixels)×(m pixels), a surface temperature ROI, i.e., an average after a summation, can be derived as follows.

The maximum entire surface temperature ROI of the human face 93 can be computed by the following equation.

$$T_{2D,mean}(t) = \frac{\sum_{i=0}^{m*m*n-1} T(t)}{m*m*n}$$

For a single square image block 95, the surface temperature $ROI_{2Dsquare}$, can be obtained by the following equation.

$$T_{2Dsquare,mean}(t) = \frac{\sum_{i=0}^{m*m-1} T(t)}{m*m}$$

The surface temperature ROI of each the thermal image is varying with time t, and each of the image blocks 95 is paired with one temperature information.

Figure 3C:
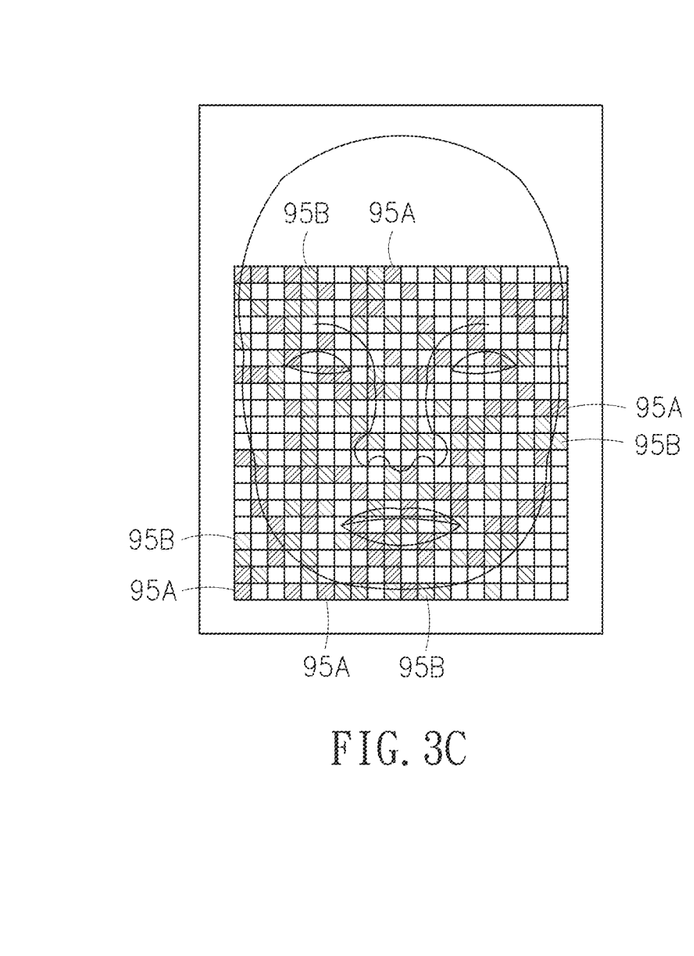

Then, in Step 210: The variation-block detecting unit 24 evaluates the variation in the continuous time-sequence data of each the image block 95 so as to divide the image block 95 into a plurality of first frequency variation blocks 95A and a plurality of second frequency variation blocks 95B, in which the first frequency is not equal to the second frequency. As shown in FIG. 3C, on a display screen, the first frequency variation blocks 95A and the second frequency variation blocks 95B would be presented by different colors. In FIG. 3C, blocks with different internal inclined lines are used to stand for different colors. In this embodiment, the variation-block detecting unit 24 can be a circuit architecture for processing the detection of block variations.

In distinguishing the first frequency variation blocks 95A from the second frequency variation blocks 95B, for example, the variation-block detecting unit 24 includes a temperature-amplitude component subunit 241 of the thermal image and a temperature-frequency component subunit 242 thereof. The temperature-amplitude component subunit 241 and the temperature-frequency component subunit 242 evaluate a variation of the temperature information of each of the image blocks 95 in the continuous time-sequence data to obtain a temperature-amplitude component and a frequency component of the same thermal image, respectively, such that the image blocks 95 can be divided into a plurality of the first frequency variation blocks 95A and a plurality of the second frequency variation blocks 95B.

To obtain the temperature-amplitude components, for example, the temperature-amplitude component subunit 241 of the thermal image in the variation-block detecting unit 24 can detect temperature variation at the thermal image. Related algorithms for obtaining the temperature-amplitude components can be, but not limited to, a method of the zero-crossing rate, a gradient extremum method or a power function method.

To obtain the frequency components, for example, the temperature-frequency component subunit 242 of the thermal image in the variation-block detecting unit 24 can utilize an EMD (Empirical mode decomposition) method to decompose the temperature-array time-sequence variation of the thermal image of the human face into several intrinsic mode functions (IMF). Further by introducing, but not limited to, a band-pass filter (BPF), the frequency components can be obtained. In this disclosure, the EMD method can be any relevant method already in the art.

Figure 3D:
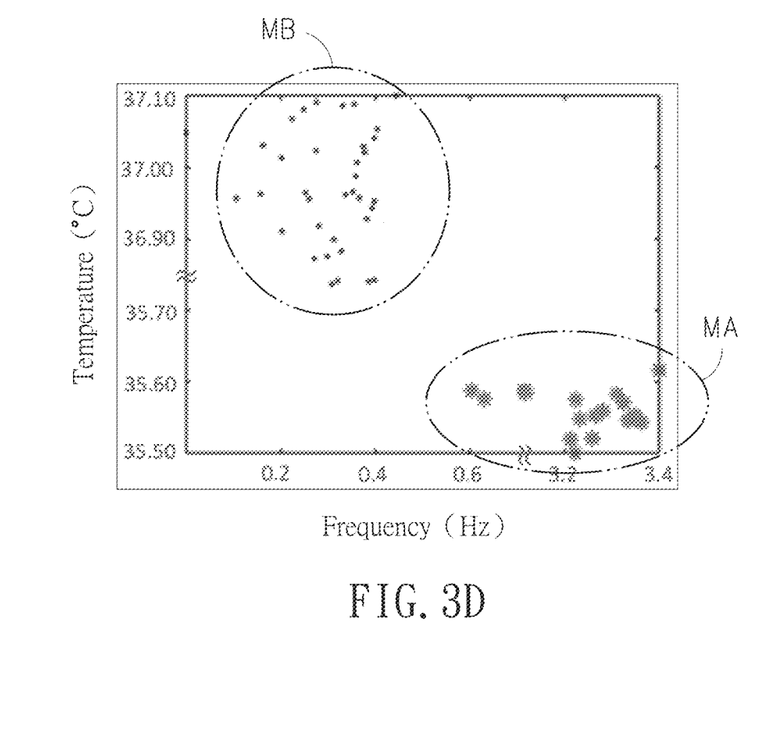

After the temperature-amplitude components and the frequency components of the thermal image have been obtained, clustering can be performed on a 2D characteristic plane having the temperature-amplitude as the Y axis and the frequency as the X axis. In clustering, the K-means or DBSCAN can be applied, but not limited thereto. As shown in FIG. 3D, a clustered result is demonstrated schematically. In FIG. 3D, a first region MA, located at a lower right portion thereof stands for the group of the first frequency variation blocks 95A, while a second region MB, located at an upper left portion thereof stands for the group of the second frequency variation blocks 95B.

Then, in performing Step 212: The computing unit 25 is used for analyzing the temperature information of the first frequency variation blocks 95A and the second frequency variation blocks 95B in the continuous time-sequence data, so that different physiological information of the human body can be obtained. In this embodiment, the computing unit 25 can be a circuit architecture for performing the calculations.

In this embodiment, as shown in FIG. 3D, the first region MA includes the first frequency variation blocks 95A having frequencies ranged within 0.5 Hz-3.5 Hz, equivalent substantially to the heart rates of normal human bodies, and the second region MB includes the second frequency variation blocks 95B having frequencies ranged within 0.167 Hz-0.417 Hz, equivalent substantially to the respiratory rates of the normal human bodies. Thereupon, a heart rate and a respiratory rate of a specific human body can be realized by the computing unit 25.

Provided that the first region MA includes H first frequency variation blocks 95A representing the heart rates, then the intrinsic mode function of the temperature signals for the variation of the heart rate can be computed by the following equation.

$$IMF_{HR,mean}(t) = \frac{\sum_{i=0}^{m*m*H-1} IMF(t)}{m*m*H}$$

Provided that the second region MB includes R second frequency variation blocks 95B representing the respiratory rates, then the intrinsic mode function of the temperature signals for the variation of the respiratory rate can be computed by the following equation.

$$IMF_{RR,mean}(t) = \frac{\sum_{j=0}^{m*m*R-1} IMF(t)}{m*m*R}$$

Figure 3E:
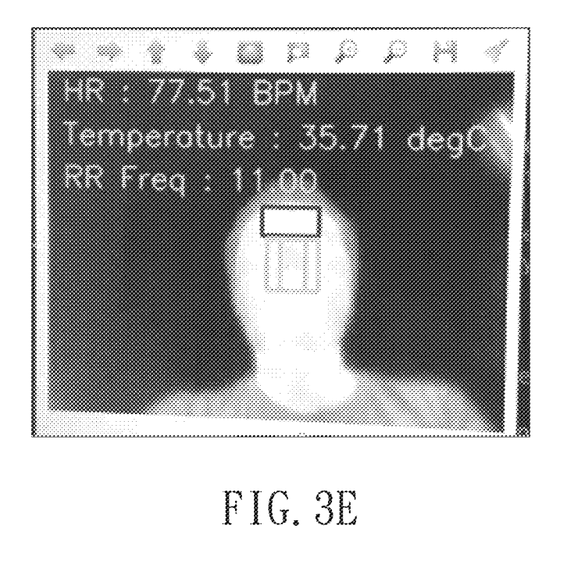

The heart rate and the respiratory rate obtained by the computing unit 25 can be displayed on a screen, as shown in FIG. 3E. In FIG. 3E, "HR: 77.51 BPM" implies that the heart rate is averaged to be 77.51 beats per minute, "Temperature: 35.71 deg C." indicates that the body temperature is averaged to be 35.71 deg C., and "RR Freq: 11.00" indicates that the respiratory rate is averaged to be 11 times per minute.

Figure 4:
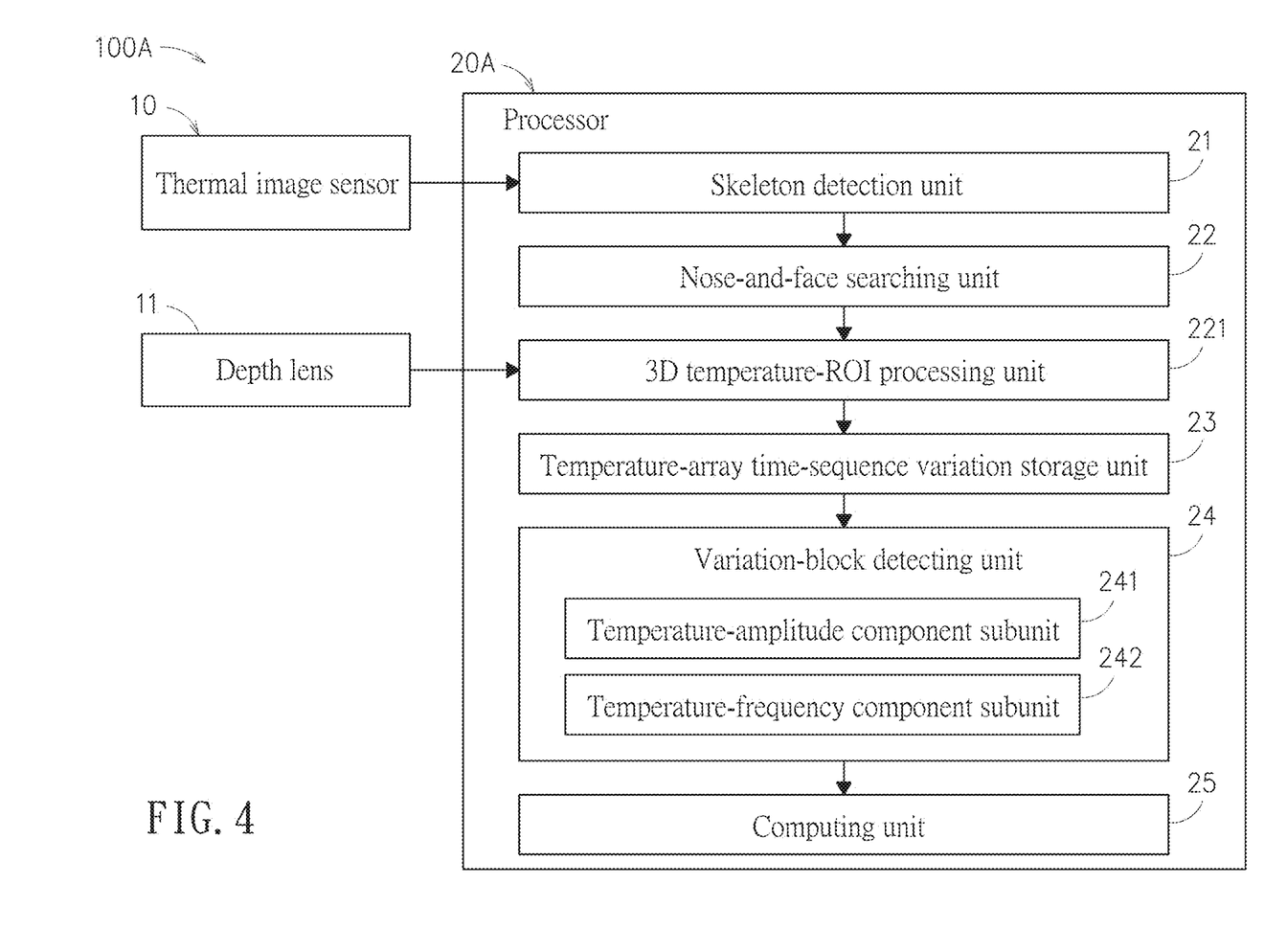
FIG. 4 is a schematic block view of another embodiment of the system for dynamic physiological characteristic region capturing in accordance with this disclosure.

Referring to FIG. 4, this embodiment is obtained by improving the embodiment of FIG. 1. In FIG. 4, the system for dynamic physiological characteristic region capturing 100A includes a thermal image sensor 10 and a processor 20A.

In this embodiment, the thermal image sensor 10 detects the human body and generates a plurality of thermal images with continuous time-sequence data, and a depth lens 11 is introduced to capture depth information of the human body.

The processor 20 includes a skeleton detection unit 21, a nose-and-face searching unit 22, a 3D temperature-ROI processing unit 221, a temperature-array time-sequence variation storage unit 23, a variation-block detecting unit 24 and a computing unit 25. The 3D temperature-ROI processing unit 221 receives the depth information captured by the depth lens 11 through detecting the human body, in which the depth information can be a distance from the depth lens 11 to the detected target (i.e., the human face).

The 3D temperature-ROI processing unit 221 can be a circuit architecture for processing the 3D temperature ROI.

In comparison between FIG. 1 and FIG. 4, the embodiment of FIG. 1 is to perform the 2D image analysis upon the human body, while the embodiment of FIG. 4 is to perform 3D image analysis upon the human body. This embodiment is furnished with the depth lens 11 and the 3D temperature-ROI processing unit 221, in which the 3D temperature-ROI processing unit 221 is utilized to locate the 3D temperature ROI of the human face, based on the depth information captured by the depth lens 11. Thereupon, contrary to the planar 2D analysis shown in FIG. 3B, the 3D image analysis upon the human body can be performed according to the depth information. Detail for performing the 3D image analysis will be elucidated as follows.

Figure 5:
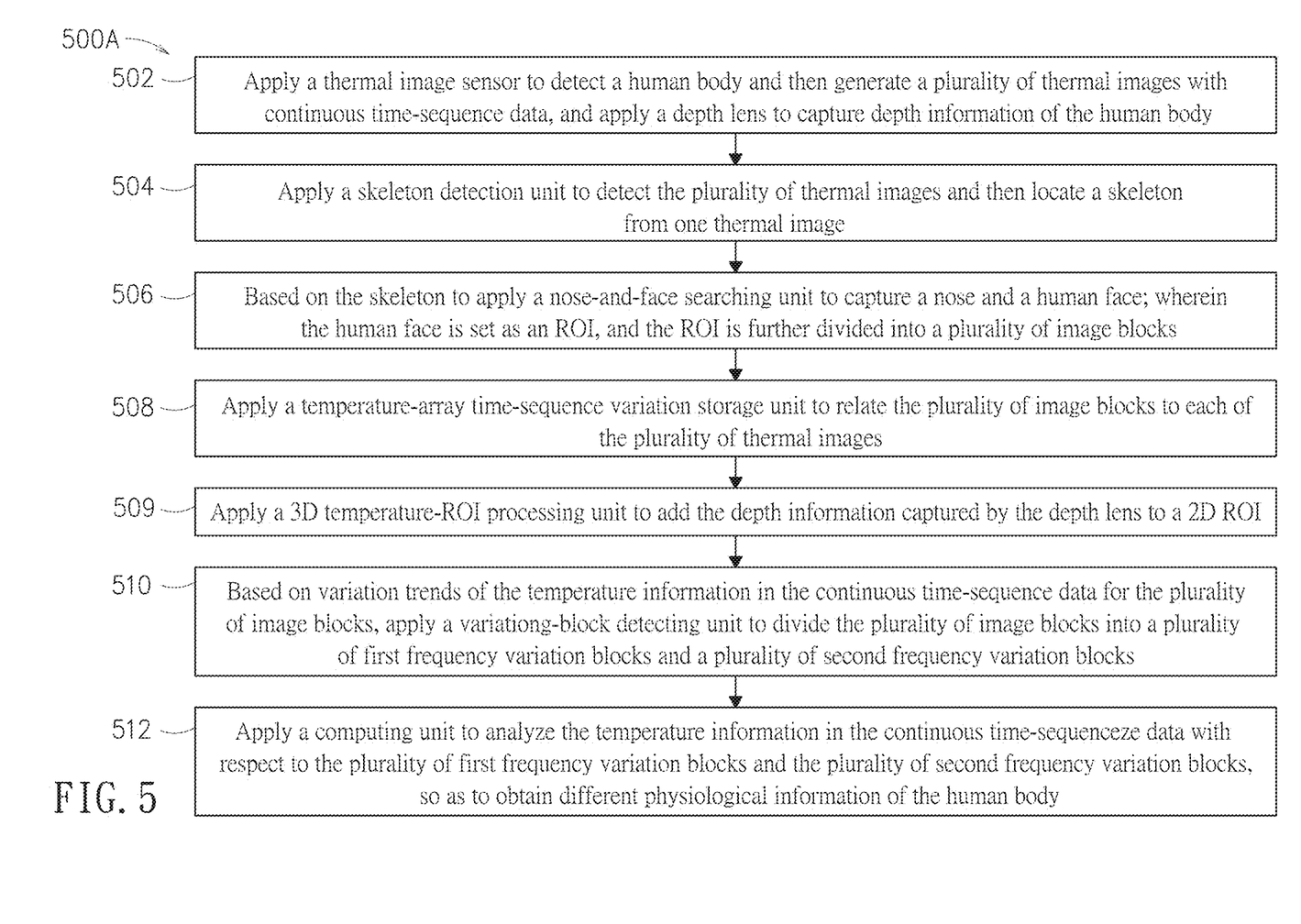
FIG. 5 is a flowchart of another embodiment of the method for dynamic physiological characteristic region capturing in accordance with this disclosure.

Referring to FIG. 4 and FIG. 5, the system for dynamic physiological characteristic region capturing 100A of FIG. 4 can be used to execute the method for dynamic physiological characteristic region capturing 500A of FIG. 5, and mainly includes Steps 502-512 as follows.

Step 502: The thermal image sensor 10 is applied to detect the human body so as to generate a plurality of thermal images with continuous time-sequence data, and the depth lens 11 is applied to capture the depth information of the human body.

Step 504: The skeleton detection unit 21 is applied to detect a plurality of thermal images, and a skeleton 91 is also obtained from one of the thermal images, as shown in FIG. 3A.

Step 506: The nose-and-face searching unit 22 evaluates the skeleton 91 to further capture a nose 92 and a human face 93 (see FIG. 3A). The human face 93 is set to be an ROI (Region of interest) 94, and the ROI 94 is divided into a plurality of image blocks 95, as shown in FIG. 3B.

Step 508: The temperature-array time-sequence variation storage unit 23 relates a plurality of image blocks 95 to each of the thermal images, such that each of the image blocks 95 has temperature information by corresponding to the continuous time-sequence data.

By comparing Steps 502~508 of FIG. 5 with Steps 202~208 of FIG. 2 one by one, differences in between include that Step 502 of FIG. 5 includes a step of applying the depth lens to capture the depth information of the human body. Except for the aforesaid step, all the other Steps are the same. Namely, embodying of Steps 502-508 would generate the same results shown in FIGS. 3A-3C.

Then, in Step 509: The 3D temperature-ROI processing unit 221 would add the depth information d captured by the depth lens 11 to the ROI 94 of the 2D plane, as shown in FIG. 3B.

Figure 6A:
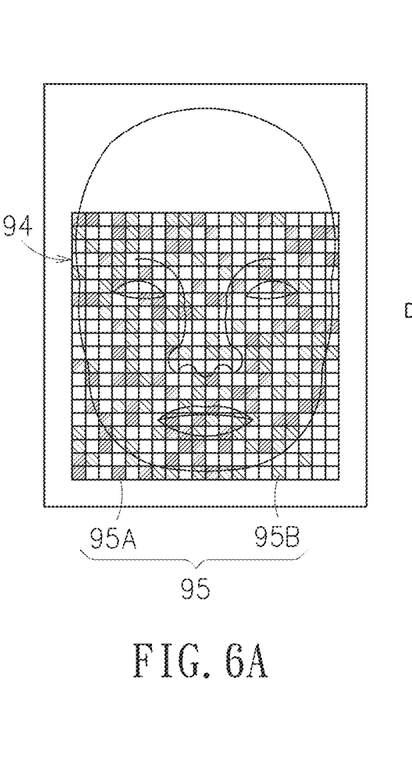
FIGS. 6A~6C show schematically different stages of transformation from a 2D ROI to a 3D ROI by adding depth information.
Figure 6B:
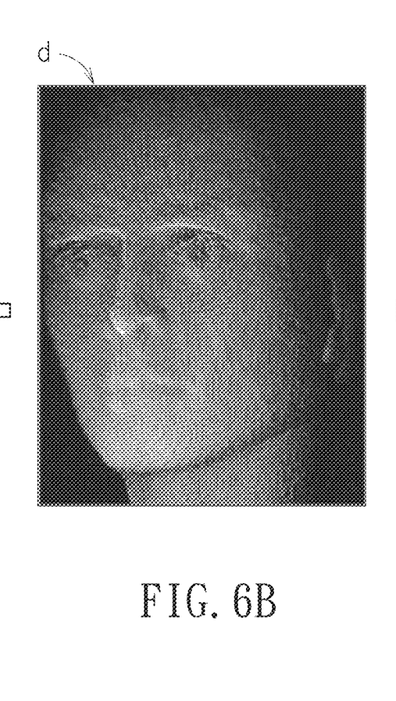
Figure 6C:
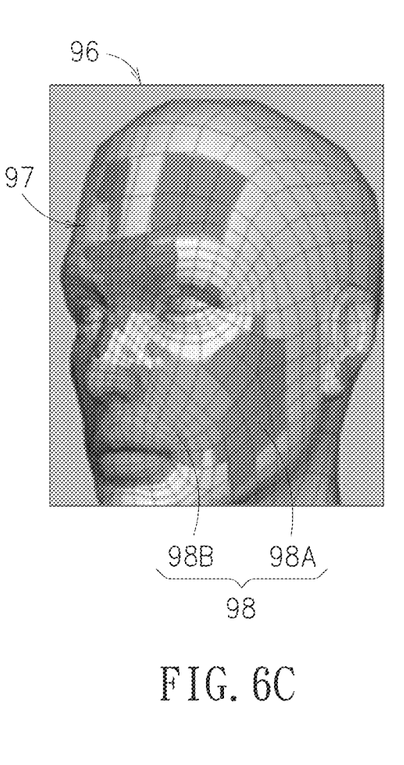

As shown in FIGS. 6A-6C, after the ROI 94 of the original 2D plane is added by the depth information d shown in FIG. 6B, the 3D ROI 96 shown in FIG. 6C would be formed. Namely, on the 3D human face 97, a plurality of first frequency variation blocks 98A and a plurality of second frequency variation blocks 98B would be formed. Different colors at the first frequency variation blocks 98A and the second frequency variation blocks 98B stand for different frequencies.

It shall be explained that colors for the first frequency variation blocks 95A and the second frequency variation blocks 95B of the 2D plane in FIG. 6A are not correlated to colors of the 3D first frequency variation blocks 98A and the 3D second frequency variation blocks 98B in FIG. 6C. Actually, the aforesaid description is simply used to explain the transformation from the 2D ROI into the 3D ROI.

Provided that the human face 97 has n square image blocks, (m pixels)×(m pixels), then, after adding the depth weight, the mean value of the 3D temperature ROI would be computed by the following equation, in which the human face is the maximum entire 3D ROI.

$$T_{3D,mean}(t) = \frac{\sum_{i=0}^{m*m*n-1} T(di, t) \times di}{\sum_{i=0}^{m*m*n-1} di}$$

A single 3D $ROI_{3Dsurface}$ can be computed as follows.

$$T_{3Dsurface,mean}(t) = \frac{\sum_{i=0}^{m*m-1} T(di, t) \times di}{\sum_{i=0}^{m*m-1} di}$$

The 3D temperature ROI of each of the thermal images is varying with the time t. Each of the image blocks 98 (i.e., the single 3D $ROI_{3Dsurface}$) is corresponding to the temperature information.

Then, in Step 510: The variation-block detecting unit 24 evaluates the variation in the continuous time-sequence data of each the image block 98 so as to divide the image block 98 into a plurality of first frequency variation blocks 98A and a plurality of second frequency variation blocks 98B.

The method to distinguish the first frequency variation block 98A from the second frequency variation block 98B is the same as the method to distinguish the first frequency variation block 95A from the second frequency variation block 95B of FIG. 2.

For example, the variation-block detecting unit 24 includes a temperature-amplitude component subunit 241 and a temperature-frequency component subunit 242 of the thermal image. The temperature-amplitude component subunit 241 and the temperature-frequency component subunit 242 evaluate the variation of the temperature information in the continuous time-sequence data of each of the image blocks 98 so as to obtain the temperature-amplitude components and the frequency components of the thermal images, such that the image block 98 can be divided into a plurality of first frequency variation blocks 98A and a plurality of second frequency variation blocks 98B.

Regarding a method for obtaining the temperature-amplitude components is introduced as follows. For example, the temperature-amplitude component subunit 241 of the thermal image in the variation-block detecting unit 24 can detect the variation of temperature over the thermal image through a method of zero-crossing rates, a gradient extremum method or a power function method to obtain the temperature-amplitude components.

Regarding a method for obtaining the frequency components is introduced as follows. For example, the temperature-frequency component subunit 242 of the thermal image in the variation-block detecting unit 24 utilizes an EMD (Empirical mode decomposition) method to decompose the temperature-array time-sequence variation of the thermal image of the human face into a plurality of intrinsic mode functions (IMF), and introduces the BPF (Band-pass filter) to further obtain the frequency components. In this embodiment, the EMD method includes, but not limited to, various optimal types.

After the temperature-amplitude components and the frequency components of the thermal images have been obtained, clustering is performed on a 2D characteristic plane having the temperature amplitude as the Y axis and the frequency as the X axis. The clustering can apply, but not limited to the K-means method or the DBSCAN method. The clustered result is then schematically shown in FIG. 3D. In FIG. 3D, a first region MA, located at a lower right portion thereof stands for the group of the first frequency variation blocks 98A, while a second region MB, located at an upper left portion thereof stands for the group of the second frequency variation blocks 98B.

Then, in performing Step 512: The computing unit 25 is used for analyzing the temperature information of the first frequency variation blocks 98A and the second frequency variation blocks 98B in the continuous time-sequence data, so that different physiological information of the human body can be obtained.

In this embodiment, as shown in FIG. 3D, the first region MA includes the first frequency variation blocks 98A having frequencies ranged within 0.5 Hz-3.5 Hz, equivalent substantially to the heart rates of normal human bodies, and the second region MB includes the second frequency variation blocks 98B having frequencies ranged within 0.167 Hz-0.417 Hz, equivalent substantially to the respiratory rates of the normal human bodies. Thereupon, a heart rate and a respiratory rate of a specific human body can be realized by the calculating unit 25.

Provided that the first region MA includes H first frequency variation blocks 98A representing the heart rates, then the intrinsic mode function of the temperature signals for the variation of the heart rate can be computed by the following equation.

$$IMF_{HR,mean}(t) = \frac{\sum_{i=0}^{m*m*H-1} IMF(di, t) \times di}{\sum_{i=0}^{m*m*H-1} di}$$

Provided that the second region MB includes R second frequency variation blocks 98B representing the respiratory rates, then the intrinsic mode function of the temperature signals for the variation of the respiratory rate can be computed by the following equation.

$$IMF_{RR,mean}(t) = \frac{\sum_{j=0}^{m*m*R-1} IMF(dj, t) \times dj}{\sum_{j=0}^{m*m*R-1} dj}$$

In a practical example, provided that the human face 97 has 81 square image blocks (9 pixels)×(9 pixels), and also that, in FIG. 3D, the first region MA includes 30 image blocks 98A representing the heart rates, then the intrinsic mode function of the temperature signals for the variation of the heart rate can be computed by the following equation.

$$IMF_{HR,mean}(t) = \frac{\sum_{i=0}^{9*9*30-1} IMF(di, t) \times di}{\sum_{i=0}^{9*9*30-1} di}$$

Wherein i stands for the i-th pixel in the heart-rate temperature-detecting block.

Provided that the second region MB includes 35 image blocks 95B representing the respiratory rates, then the intrinsic mode function of the temperature signals for the variation of the respiratory rate can be computed by the following equation.

$$IMF_{RR,mean}(t) = \frac{\sum_{j=0}^{9*9*35-1} IMF(dj, t) \times dj}{\sum_{j=0}^{9*9*35-1} dj}$$

Wherein j stands for the j-th pixel in the respiratory-rate temperature-detecting block.

The heart rate and the respiratory rate obtained by the computing unit 25 can be displayed on a screen, as shown in FIG. 3E. In FIG. 3E, "HR: 77.51 BPM" implies that the heart rate is averaged to be 77.51 beats per minute, "Temperature: 35.71 deg C." indicates that the body temperature is averaged to be 35.71 deg C., and "RR Freq: 11.00" indicates that the respiratory rate is averaged to be 11 times per minute.

By comparing two different systems in FIG. 1 and FIG. 4, and also two different methods in FIG. 2 and FIG. 5, the major difference is at the introduction of the technique related to the depth lens and the depth information. Since the human body is set to be a 3D detected target, thus after the depth information is included, the detection upon the body temperature, the heart rate or the respiratory rate can be much more precise.

In summary, the method and the system for dynamic physiological characteristic region capturing provided by this disclosure follow a non-contact and image-less privacy manner to use a thermal-image lens to capture a dynamic ROI demonstrating remarkable variation in the body temperature on the human face (i.e., by detecting or tracking a 3D or 2D ROI within a non-fixed area), and further to detect simultaneously the heart rate and the respiratory rate. If the thermal-image lens is further integrated with the depth lens which provides the depth information for obtaining the temperature ROI. Thereupon, the detection of the heart rate and the respiratory rate can be more accurate. In addition, this disclosure utilizes the skeleton to locate the position of the human face in the thermal image, not a regular identification of the human face. Further, the disclosure is to capture a dynamic ROI position, not a fixed ROI position.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for obtaining a heart rate and a respiratory rate by capturing dynamic physiological characters without physical contact, comprising the steps of:
   (A) generating a plurality of thermal images with continuous time-sequence data during detecting a human body using a thermal image sensor;
   (B) locating a structural contour of said human body from one of a plurality of thermal images detected by a skeleton detection unit circuitry;
   (C) based on the structure structural contour, using a nose-and-face searching unit circuitry to capture a nose and a human face of said human body; wherein the human face is set as an ROI (Region of interest), and the ROI is further divided into a plurality of image blocks;
   (D) relating the plurality of image blocks to each of the plurality of thermal images by using a temperature-array time-sequence variation storage unit circuitry, wherein each of the plurality of image blocks has corresponding temperature information in the continuous time-sequence data;
   (E) dividing the plurality of image blocks into a plurality of first frequency variation blocks and a plurality of second frequency variation blocks using a variation-block detecting unit circuitry, based on variation of the temperature information in the continuous time-sequence data for the plurality of image blocks, wherein the variation-block detecting circuitry includes a temperature-amplitude component subunit circuitry and a temperature-frequency component subunit circuitry that collectively evaluate variation of the temperature information in the continuous time-sequence data upon the plurality of thermal blocks to obtain temperature-amplitude components and frequency components of the plurality of thermal images to divide the plurality of image blocks into the plurality of first frequency variation blocks and the plurality of second frequency variation blocks;

(F) analyzing the temperature information in the continuous time-sequence data with respect to the plurality of first frequency variation blocks and the plurality of second frequency variation blocks using a computing unit circuitry, wherein said heart rate of said human body is obtained by analyzing the temperature information of the plurality of first frequency variation blocks in the continuous time-sequence data, and said respiratory rate of said human body is obtained by analyzing the temperature information of the plurality of second frequency variation blocks in the continuous time-sequence data; and (G) displaying said heart rate and respiratory rate on a screen.

2. The method for dynamic physiological characteristic region capturing of claim 1, wherein, in the Step (B), the structure contour detection unit circuitry detects a color heatmap diagram of the one of the plurality of thermal images to obtain the structure contour; wherein, in the Step (C), the nose-and-face searching unit circuitry evaluates the structure contour in the color heatmap diagram to obtain the nose and the human face of said human body, and the nose and the human face are overlapped into a grey-scale heatmap diagram of the one of the plurality of thermal images.

3. The method for dynamic physiological characteristic region capturing of claim 2, wherein, in the Step (C), the nose-and-face searching circuitry has a position of the nose as a center and a distance from the center to an obvious interface in the grey-scale heatmap diagram as a radius to draw the human face, and the human face is set as the ROI.

4. The method for dynamic physiological characteristic region capturing of claim 1, wherein, in the Step (C), the nose-and-face searching circuitry divides the ROI into Z square image blocks by (X pixels)×(Y pixels).

5. The method for dynamic physiological characteristic region capturing of claim 1, wherein the temperature-amplitude component subunit circuitry detects temperature variation of the plurality of thermal images to obtain the temperature-amplitude components.

6. The method for dynamic physiological characteristic region capturing of claim 1, wherein the temperature-frequency component subunit circuitry utilizes an EMD (Empirical mode decomposition) method to decompose temperature-array time-sequence variation of the plurality of thermal images of the human face into a plurality of intrinsic mode functions (IMF), and introduces a BPF (Band-pass filter) to further obtain the frequency components.

7. The method for dynamic physiological characteristic region capturing of claim 1, wherein the variation-block detecting circuitry performs clustering on a 2D characteristic plane having a temperature amplitude as a Y axis and a frequency as an X axis to divide the plurality of image blocks into a plurality of first frequency variation blocks and a plurality of second frequency variation blocks.

8. The method for dynamic physiological characteristic region capturing of claim 1, wherein the first frequency is within 0.5 Hz~3.5 Hz, and the second frequency is within 0.167 Hz~0.417 Hz.

9. The method for dynamic physiological characteristic region capturing of claim 1, between the Step (D) and the Step (E), further including a Step (D1) of applying a 3D temperature-ROI processing circuitry to add depth information of said human body captured by a depth lens to the ROI so as to transform the 2D ROI into a 3D ROI.

10. A system for obtaining a heart rate and a respiratory rate by capturing dynamic physiological characters without physical contact, comprising:
a thermal image sensor, detecting a human body and generating a plurality of thermal images with continuous time-sequence data; and
a processor, including:
skeleton detection unit circuitry, detecting the plurality of thermal images and then locating a structural contour of said human body from one of the plurality of thermal images;
a nose-and-face searching unit circuitry, capturing a nose and a human face of said human body, wherein the human face is set as an ROI (Region of interest), and the ROI is further divided into a plurality of image blocks;
a temperature-array time-sequence variation storage unit circuitry, relating the plurality of image blocks to each of the plurality of thermal images, wherein each of the plurality of image blocks has corresponding temperature information in the continuous time-sequence data;
a variation-block detecting unit circuitry, evaluating variation of the temperature information in the continuous time-sequence data for the plurality of image blocks to divide the plurality of image blocks into a plurality of first frequency variation blocks and a plurality of second frequency variation blocks, wherein the variation-block detecting circuitry includes a temperature-amplitude component subunit circuitry and a temperature-frequency component subunit circuitry that collectively evaluate variation of the temperature information in the continuous time-sequence data upon the plurality of thermal blocks to obtain temperature-amplitude components and frequency components of the plurality of thermal images to divide the plurality of image blocks are divided into the plurality of first frequency variation blocks and the plurality of second frequency variation blocks; and
a computing unit circuitry, analyzing the temperature information in the continuous time-sequence data with respect to the plurality of first frequency variation blocks and the plurality of second frequency variation blocks, so as to obtain said heart rate of said human body by analyzing the temperature information of the plurality of first frequency variation blocks in the continuous time-sequence data, and analyzing the temperature information of the plurality of second frequency variation blocks in the continuous time-sequence data to obtain said respiratory rate of said human body; and
a display unit circuitry, configured for displaying said heart rate and said respiratory rate on a screen.

11. The system for dynamic physiological characteristic region capturing of claim 10, further including a depth lens for capturing depth information of said human body.

12. The system for dynamic physiological characteristic region capturing of claim 11, wherein the processor further includes a 3D temperature-ROI processing unit circuitry for adding the depth information of said human body captured by the depth lens to the ROI so as to transform a 2D ROI into a 3D ROI.

13. The system for dynamic physiological characteristic region capturing of claim 10, wherein the structure contour detection unit circuitry detects a color heatmap diagram of the one of the plurality of thermal images to obtain the structure contour, and the nose-and-face searching unit circuitry evaluates the structure contour in the color heatmap diagram to obtain the nose and the human face, and the nose and the human face are overlapped into a grey-scale heatmap diagram of the one of the plurality of thermal images.

14. The system for dynamic physiological characteristic region capturing of claim 10, wherein the nose-and-face searching circuitry has a position of the nose as a center and a distance from the center to an obvious interface in the grey-scale heatmap diagram as a radius to draw the human face, and the human face is set as the ROI.

15. The system for dynamic physiological characteristic region capturing of claim 10, wherein the nose-and-face searching circuitry divides the ROI into Z square image blocks 20 by (X pixels)×(Y pixels).

16. The system for dynamic physiological characteristic region capturing of claim 10, wherein the temperature-amplitude component subunit circuitry detects temperature variation of the plurality of thermal images to obtain the temperature-amplitude components.

17. The system for dynamic physiological characteristic region capturing of claim 10, wherein the temperature-frequency component subunit circuitry utilizes an EMD (Empirical mode decomposition) method to decompose temperature-array time-sequence variation of the plurality of thermal images of the human face into a plurality of intrinsic mode functions (IMF), and introduces a BPF (Band-pass filter) to further obtain the frequency components.

* * * * *